United States Patent

Nissen

[11] 4,321,980
[45] Mar. 30, 1982

[54] MONO STICK ASSEMBLY WITH ADJUSTABLE CREEP CONTROL

[75] Inventor: Roland N. Nissen, Wichita, Kans.

[73] Assignee: J. I. Case Company, Racine, Wis.

[21] Appl. No.: 167,894

[22] Filed: Jul. 14, 1980

[51] Int. Cl.³ .......................... B60K 41/00; G05G 9/04
[52] U.S. Cl. ..................................... 180/333; 180/6.48
[58] Field of Search ...................... 180/333, 6.48, 335; 74/471 Y, 471 R, 473 R

[56] References Cited

U.S. PATENT DOCUMENTS

| | | | |
|---|---|---|---|
| 3,590,934 | 7/1971 | Wappler | 180/333 |
| 3,677,362 | 7/1972 | Chatterjea | 180/6.48 |
| 3,768,328 | 10/1973 | Campbell | 74/471 Y X |
| 3,891,042 | 6/1975 | Braun | 180/6.48 |
| 3,892,286 | 7/1975 | Clevenger, Jr. et al. | 180/333 |
| 4,206,602 | 6/1980 | Watson et al. | 74/471 Y X |

Primary Examiner—Joseph F. Peters, Jr.
Assistant Examiner—Donn McGiehan
Attorney, Agent, or Firm—Cullen, Sloman, Cantor, Grauer, Scott & Rutherford

[57] ABSTRACT

A hydraulic control system is disclosed for a hydrostatically operated earth-working machine which controls ground speed, forward and reverse movement, steering, and braking, for the machine. The hydraulic control system includes an improved mono stick assembly having a manually operable handle assembly mounted within a resilient pivot bushing that permits pivotal movement of the handle assembly in any direction. The pivotal movement of the handle assembly is transmitted to a control rod assembly which is mounted to a universal pivot joint that permits both longitudinal sliding movement and lateral pivotal movement of the rod assembly in response to selective pivotal movement of the handle assembly. Cable assemblies are mounted between the rod assembly and the hydraulic propulsion pump and steering valve. The rod assembly is movable longitudinally in response to selective pivotal movement of the handle assembly in a first direction thereby actuating the propulsion pump for controlling forward and reverse movement and ground speed of the machine. Pivotal movement of the handle assembly in a second direction transverse to the first direction causes the rod assembly to pivot laterally about the universal pivot joint to thereby actuate the steering valve. The present invention further includes an adjustable creep control assembly which can be selectively set independently of the mono stick assembly during high load, low machine speed conditions, thereby releasing the operator from constantly manipulating the mono stick control during such conditions. The mono stick assembly includes a locking mechanism for selectively holding the handle assembly in a fixed neutral position while the adjustable creep control assembly is being used to independently actuate the propulsion pump.

7 Claims, 4 Drawing Figures

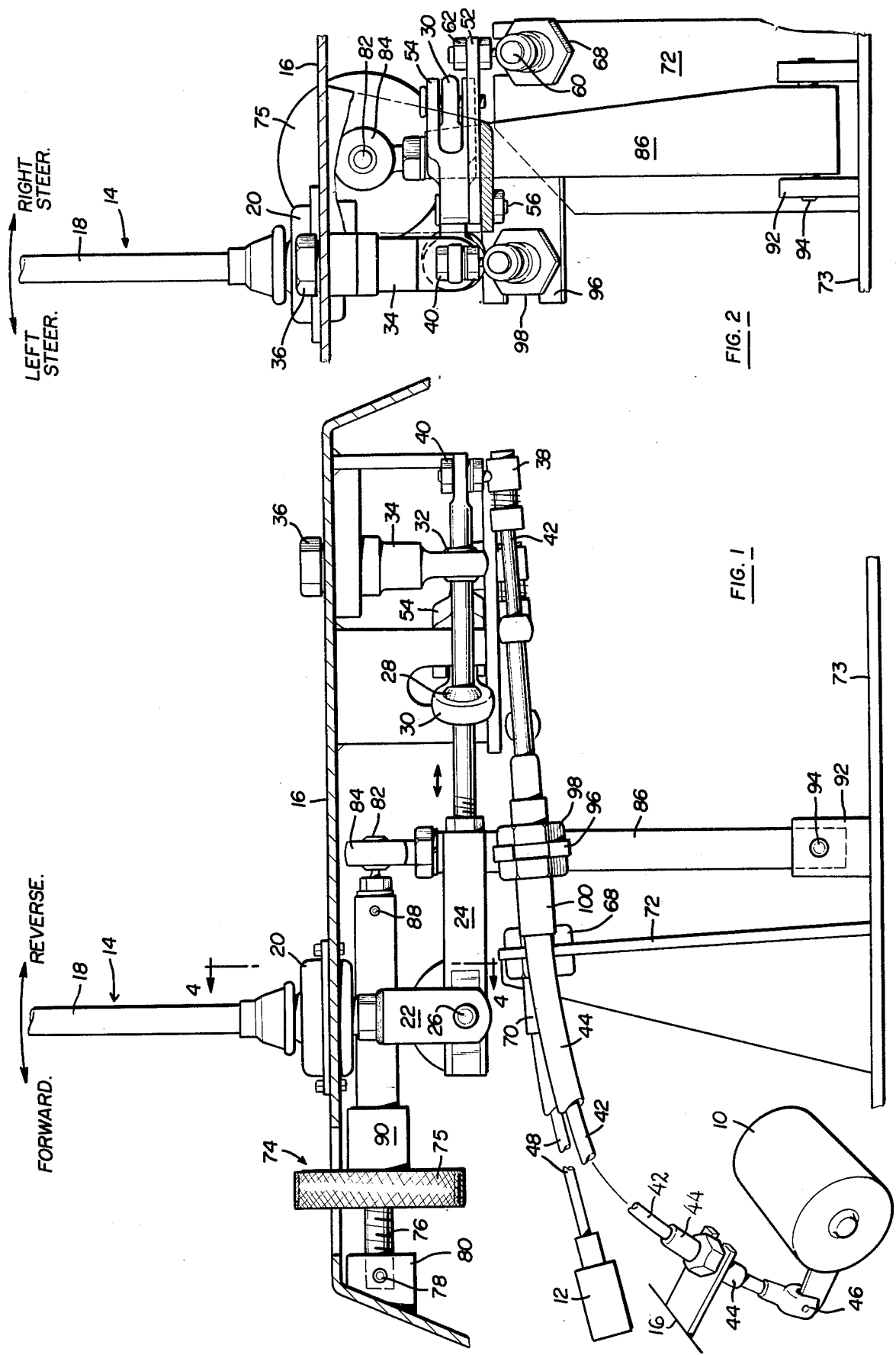

MONO STICK ASSEMBLY WITH ADJUSTABLE CREEP CONTROL

BACKGROUND OF THE INVENTION

The present invention relates to a hydraulic control system for a hydrostatically operated earth-working machine having plural hydraulic circuits, and more particularly, to a control system for controlling ground speed, forward and reverse movement, steering, and braking for the machine.

It is conventional to provide a hydrostatically operated earthworking machine having separate hydraulic systems, including one for powering the ground drive, another for providing steering, and still another for powering the implement attachment. Typically, the operator manually adjusts the ground speed of the machine depending upon the load resistance being encountered by the implement. This manual correlation between ground speed and implement load is intended to maintain a constant load on the machine and thereby provide optimum engine efficiency.

A problem with known hydraulically operated tractor-implement systems is that the operator must constantly monitor the load conditions of the implement and simultaneously adjust the ground speed in response thereto. In practice, it is nearly impossible for the operator to maintain optimum engine efficiency and still perform the other operations required of him in running the machine.

For example, in known hydrostatically operated trenchers, a trenching boom is mounted to the tractor and one hydraulic system powers the digging chain on the boom while other hydraulic systems control ground speed, forward and reverse movement, steering, and braking. If the powered digging chain suddenly encounters a rocky soil condition, the operator must slow the tractor until the higher pressure developed in the trencher hydraulic circuit, due to the increased load, is reduced either by the trencher passing through the area or by some operator action. At the same time the operator is attempting to maintain maximum tractor engine efficiency, he must steer the unit and perform other normal running operations.

A conventional manual control, generally known as a mono stick assembly, allows the operator to use only one manually operable handle to control ground speed, forward and reverse movement, steering, aand braking for the machine. As would be expected, the mono stick control assembly has improved the operator's ability to perform the operations required of him in running the machine. However, known constructions of mono stick assemblies are relatively complex and expensive and generally custom designed for the particular machine on which they are being used. Thus, there has been a need for an improved mono stick assembly which is simpler, less expensive, and adaptable for use in various machines while still combining the control for several machine functions into one assembly.

A further problem with conventional manual controls, including the mono stick type, is that they are not always effective in maintaining high engine efficiency during high load conditions because it is not always possible for the operator to give his undivided attention to monitoring the implement load and ground speed variables. Thus, there has been a need for an additional ajustable control associated with the mono stick assembly which can be selectively set independently of the mono stick assembly during high load, low machine speed conditions without requiring the operator to constantly manipulate the mono stick control.

The disadvantages of present hydrostatically operated earthworking machines have resulted in the hydraulic control system of the present invention which effectively reduces required operator participation and results in greater output because the tractor engine may be controlled to operate at substantially optimum efficiency, particularly during high load, low machine speed operations.

SUMMARY OF THE INVENTION

In accordance with the present invention, a hydraulic control system is provided for hydrostatically operated earth-working machines which controls ground speed, forward and reverse movement, steering, and braking for the machine.

The present invention may be utilized in any earth-working machine where it is desirable to control the directional ground movement and speed of the machine while at the same time control the ground speed of the machine in accordance with the load imposed on the ground engaging implement.

The present invention includes an improved mono stick assembly having a manually operable handle assembly mounted within a resilient pivot bushing that permits pivotal movement of the handle assembly in any direction. The movement of the handle assembly along a fore and aft axis causes the machine to move in a forward or reverse direction, respectively. The ground speed of the machine in the selected direction is controlled by the amount of handle movement in that direction. In a similar manner, the steering of the machine is controlled by pivoting the handle assembly along an axis transverse to the fore-aft axis. The resilient pivot bushing not only permits pivotal movement of the handle assembly in any direction but also provides a self-centering feature for braking should the handle assembly be released.

The pivotal movement of the handle assembly is transmitted to a control rod assembly which is pivotally attached to one end of the handle assembly. The control rod assembly is further mounted to a universal pivot joint which permits both longitudinal sliding movement and lateral pivotal movement of the rod assembly in response to selective pivotal movement of the handle assembly. A cable assembly, similar to a Bowden cable, is pivotally mounted at one of its ends to the rod assembly, and its other end is mounted to a hydraulic propulsion pump. When the handle assembly is moved fore and aft, the control rod assembly is caused to slide in a corresponding manner to extend or retract the cable assembly, thereby actuating the hydraulic pump to move the machine in a selected direction and at a selected ground speed depending on the amount of pivotal movement of the handle by the operator.

A second Bowden-like cable assembly is operably connected to the control rod assembly by means of a unique lever assembly. The second cable assembly is connected to a steering valve for controlling the turning of the machine in response to transverse pivotal movement of the mono stick handle assembly. One of the lever assembly includes a ball joint through which the control rod assembly passes. Thus, when the mono stick handle is moved fore and aft, the control rod slides longitudinally through the ball joint without effecting movement of the lever assembly or actuation of the steering valve. If the mono stick handle is pivoted transversely of the fore-aft axis, the control rod assembly pivots laterally about the universal pivot joint and thereby causes a corresponding actuation of the steering valve by means of the lever assembly and second cable arrangement. Thus, the mono stick assembly of the present invention is simpler, less expensive, and more adaptable for use in various machines than prior mono stick constructions while still combining the control for several machine functions into one assembly.

The present invention further includes an adjustable creep control assembly which can be selectively set independently of the mono stick assembly during high load, low machine speed conditions thereby releasing the operator from constantly manipulating the mono stick control during such conditions. The cable assembly which is attached to the hydraulic propulsion pump includes a core rod and housing along a part of its length similar to a bowden cable. The core rod is connected at one end to the control lever actuator for the pump. The adjustable creep control assembly is connected to the cable housing for selectively moving the housing relative to the core rod thereby actuating the propulsion pump independently of any movement by the control rod assembly as described. Thus, the adjustable creep control assembly provides an additional control associated with the improved mono stick assembly which can be selectively set independently of the mono stick assembly during high load, low machine speed conditions to improve the operator's ability to perform the operations required of him in running the machine.

The mono stick assembly of the present invention further includes a locking mechanism for selectively holding the handle assembly in a fixed neutral position while the adjustable creep control assembly is being used to independently actuate the propulsion pump. The lower end of the handle assembly includes a molded tip which may be selectively turned down into locking engagement with aa resilient brake shoe by turning the handle. The handle assembly may still be pivoted from its locked position to override the creep control if necessary. Thus, the operator always has complete control of the machne with the mono stick assembly because the one handle mono stick assembly can be used to override the creep setting such that the operarator need not remove his hand from the mono stick handle to release the creep control.

Other advantages and meritorious features of the hydraulic control system of the present invention will be more fully understood from the following description of the preferred embodiment, the appended claims, and the drawings, a brief description of which follows.

BRIEF DESCRIPTION OF DRAWINGS

FIG. 1 is a side elevational view of the improved mono stick assembly of the present invention with the adjustable creep control.

FIG. 2 is an end view of the mono stick assembly and creep control.

DETAILED DESCRIPTION OF THE INVENTION

Figure 4:
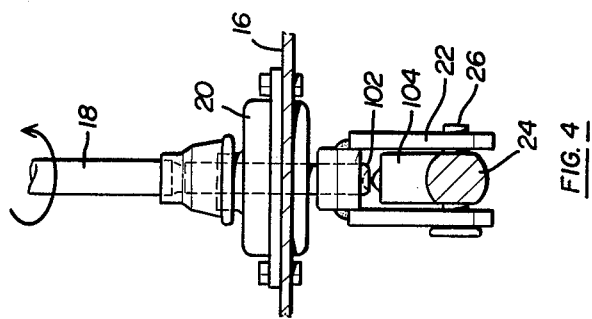
FIG. 4 is a cross-sectional view taken along line 4—4 in FIG. 1 illustrating the locking mechanism for the handle assembly.

A preferred embodiment of the hydraulic control system for a hydrostatically operated earth-working machine made in accordance with the teachings of the present invention is illustrated in FIGS. 1-4.

The present invention may be utilized in any earth-working machine such as a hydrostatically operated trencher where it is desirable to control the directional ground movement, speed, and braking of the machine while at the same time controlling the ground speed in accordance with the load imposed on the ground engaging implement. Details of the construction of the actual earth-working machine on which the present invention is used are unnecessary since they form no part of the present invention.

The machine includes separate hydraulic systems, as is conventional, for powering and steering the ground engaging wheels (not shown). Referring to FIG. 1, the ground drive circuit includes a hydraulic propulsion pump 10 and steering valve 12 which are actuated by mono stick assembly 14, as will be described, to control ground speed, forward and reverse movement, steering, and braking for the machine. The propulsion pump 10 and steering valve 12 are part of conventional hydraulic circuits for ground drive and by themselves form no part of the present invention.

In accordance with the present invention, an improved mono stick assembly 14 is provided as illustrated in FIGS. 1-4. The mono stick assembly 14 includes a manually operable handle assembly 18 which is mounted to machine frame 16 by resilient pivot bushing 20. Bushing 20 is a bonded rubber spring that permits pivotal movement of handle assembly 18 in any direction and also supplies a self-centering feature for braking which returns the handle to its normally vertical neutral position should the handle be released.

Referring to FIG. 1, the pivotal movement of the handle assembly 18 along a fore and aft axis, as illustrated by the directional arrow, causes the machine to move in a forward or reverse direction, respectively. The ground speed of the machine in the selected direction is controlled by the amount of handle movement in that direction. Similarly, the steering of the machine is conrolled by pivoting handle assembly 18 along an axis transverse to the fore-aft axis as illustrated by the directional arrow in FIG. 2. As described, the resilient pivot bushing 20 not only permits pivotal movement of the handle assembly 18 in any direction but also provides a self-centering feature to return the handle to a vertical neutral position when the handle is released.

Figure 3:
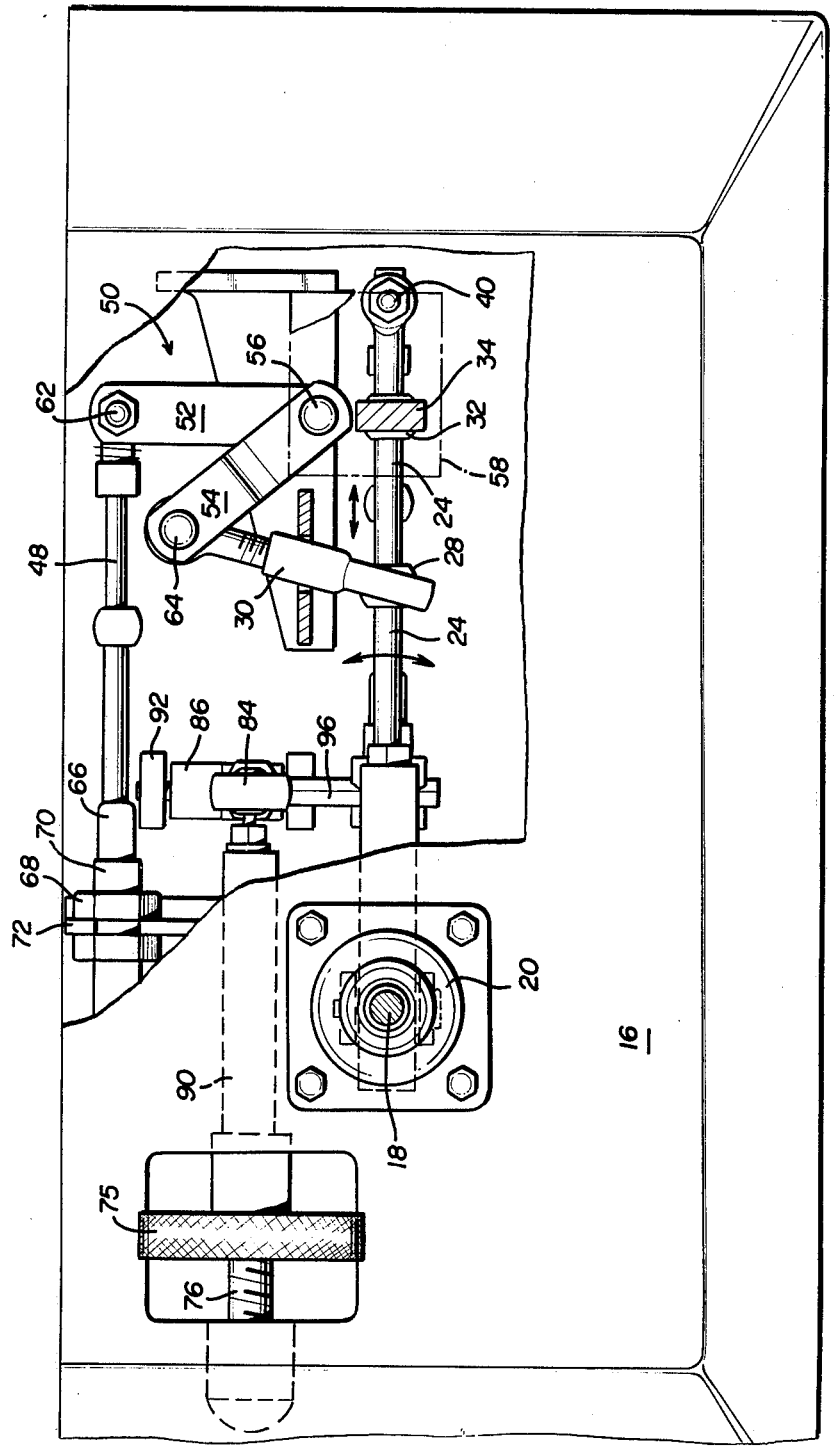
FIG. 3 is a top plan view of the mono stick assembly and creep control with a portion of the frame cut away for easier viewing.

Referring to FIGS. 1 and 3, the pivotal movement of the handle assembly 18 is transmitted to control rod assembly 24 which is attached to handle clevis 22 by pin 26. Control rod assembly 24 extends longitudinally through swivel ball joint 28 of rod 30 and is further mounted to swivel ball 32 on universal pivot mount 34. The universal pivot mount 34 is fixed to frame 16 by securing bolt 36, and it permits both longitudinal sliding movement and lateral pivoting movement of rod assembly 24, as illustrated by the directional arrows in FIG. 3, in response to selective pivotal movement of handle assembly 18.

A Bowden-like cable assembly including core rod 42, for actuating hydraulic propulsion pump 10, is pivotally connected at one of its ends by ball joint 38 and bolt 40 to the end of rod assembly 24. The core rod 42 is connected at its other end to pump control lever 46. When handle assembly 18 is moved fore and aft, as shown in FIG. 1, control rod assembly 24 is caused to longitudinally slide in a corresponding manner to extend or retract cable core rod 42 thereby actuating hydraulic propulsion pump 10 to move the machine in a selected direction and at a selected ground speed depending on the amount of pivotal movement of the handle by the operator.

A second Bowden-like cable assembly including a core rod 48 is operably connected to control rod assembly 24 by means of a unique lever assembly 50 as best illustrated in FIG. 3. Core rod 48 of the second cable assembly is connected at one end to steering valve 12 for controlling the turning of the machine in response to transverse pivotal movement of the mono stick handle assembly 14 as described. Lever assembly 50 includes a flat arm 52 fixed to a yoke arm 54 such that the arms 52 and 54 pivot about fixed pivot 56 mounted to sub-frame 58. Lever assembly 50 further includes rod 30 and swivel ball joint 28 through which control rod assembly 24 passes. Rod 30 is pivotally connected to yoke arm 54 by pivot pin 64.

Thus, when the mono stick handle 8 is moved fore and aft, control rod 24 slides longitudinally through ball joint 28 without effecting movement of lever assembly 50 or actuation of steering valve 12. If handle 18 is pivoted transversely of the fore-aft axis, control rod assembly 24 pivots laterally about universal pivot joint 34 and thereby causes a corresponding actuation of steering valve 12 by means of lever assembly 50 and cable assembly core rod 48.

The second cable assembly including core rod 48 is pivotally attached to lever arm 52 by ball joint 60 and bolt 62. Cable housing 66 surrounds core rod 48 substantially along its entire length. Housing 66 is mounted to frame arm 72, which extends vertically from base 73, by nut assembly 68 and collar 70. As described, the mono stick assembly including handle assembly 18, control rod assembly 24, and cable assemblies generally 42 and 48 provide a simpler, less expensive, and more adaptable construction than provided by prior mono stick assemblies.

The present invention further includes an adjustable creep control assembly generally 74 which can be selectively set independently of the mono stick assembly 14 during high load, low machine speed conditions, thereby releasing the operator from constantly manipulating the mono stick control during such conditions. The adjustable creep control assembly 74 includes a hand wheel 75 which is selectively movable on threaded stub shaft 76 that is connected to frame bracket 80 by pin 78. Hand wheel 74 is fixed to one end of threaded collar 90, and the opposite end of collar 90 includes a ball stud 82 that is connected to collar 90 by pin 88. The ball of stud 82 is pivotally mounted in the swivel end 84 of control arm 86. Control arm 86 is pivotally mounted to base 73 by bracket 92 and pin 94 and is pivoted about the axis of pin 94 in response to movement of hand wheel 74 and collar 90 on threaded shaft 76.

The housing 44 of core rod 42 extends along a substantial part of the length of the core rod. Housing 44 is anchored to the machine frame 16 at one of its ends as illustrated in FIG. 1. The adjustable creep control assembly 74 is also connected to cable housing 44 by bracket 96, which is fixed to control arm 86, nut assembly 98, and collar 100. Core rod 42 and housing 44 form a large arcuate bend between bracket 96 and propulsion pump 10 for a purpose to be described.

Cable housing 44 is selectively moved longitudinally relative core rod 42 in response to manual adjustment on hand wheel 75 thereby actuating propulsion pump 10 independently of any movement by the control rod assembly 24. The adjustment of hand wheel 75 causes housing 44 to either buckle or stretch which, in either case, results in a corresponding movement of core rod 42 and actuation of pump 10. Thus, the creep control assembly 74 provides an additional "fine" control associated with the improved mono stick assembly 14 which can be selectively set independently of the mono stick assembly during high load, low machine speed conditions to improve the operator's ability to perform the operations required of him in running the machine.

The mono stick assembly 14 of the present invention further includes a locking mchanism as shown in FIG. 4 for selectively holding the handle assembly 18 in a fixed vertical neutral position while the adjustable creep control 74 is being used to independently actuate the propulsion pump 10. The lower end of handle 18 includes a molded tip 102 which may be selectively turned down into locking engagement with resilient brake shoe 104 on rod assembly 24 by turning handle 18 as indicated by the directional arrow in FIG. 4. Handle assembly 18 may still be pivoted from its locked position to override creep control 74 if necessary. Thus, the operator always has complete control of the machine with the mono stock assembly because the one handle mono stick assembly 14 can be used to override the creep setting such that the operator need not remove his hand from the mono stick handle to release the creep control.

The present hydraulic control system operates as follows. When handle assembly 18 is moved fore and aft as illustrated in FIG. 1, the control rod assembly 24 is slidably shifted longitudinally through ball joint 28 and ball joint 32 to extend or retract core rod 42 thereby actuating propulsion pump 10 for controlling forward and reverse movement and ground speed of the machine. The longitudinal sliding movement of rod assembly 24 through ball joints 28 and 32 occurs without effecting movement of the lever assembly 50 or actuation of steering valve 12. If the mono stick handle 18 is pivoted transversely of the fore-aft axis as illustrated in FIG. 2, the control rod assembly 24 pivots laterally about universal pivot joint 32 to thereby cause a corresponding pivotal motion of lever assembly 50 and actuation of steering valve 12 through the extension and retraction of core rod 48. To operate the adjustable creep control 74 during high load, low machine speed conditions, the operator first rotates handle 18, as illustrated in FIG. 4, to turn down molded tip 102 into locking engagement with resilient brake shoe 104. Then, the hand wheel 75 is turned which causes cable housing 44 to move relative to core rod 42 thereby actuating propulsion pump 10 independently of any movement by the rod assembly 24. Handle assembly 18 may still be pivoted from its locked position to override the creep control if necessary since the movement of rod assembly 24 is not associated with the movement of housing 44 by creep control 74. Thus, while the operator can release handle 18 while operating creep control 74, he may easily resume complete control of the machine by pivoting handle 18 to override the creep setting.

It will be apparent to those skilled in the art that the foregoing disclosure is exemplary in nature rather than limiting, the invention being limited only by the appended claims.

I claim:

1. A control system for a hydrostatically operated earth-working machine having plural hydraulic circuits, said control system controlling ground speed, forward and reverse movement, steering, and braking for said machine, said control system comprising:

a mono stick assembly including a manually operable handle assembly mounted within a resilient pivot bushing which permits pivotal movement of said handle assembly in any direction, a rod assembly pivotally connected to one end of said handle assembly, said rod assembly being mounted to a universal pivot means, said universal means permitting longitudinal sliding movement of said rod assembly and pivotal movement of said rod assembly in response to selective pivotal movement of said handle assembly;

a first cable assembly pivotally mounted at one of its ends to said rod assembly, the other end of said cable assembly mounted to a hydraulic propulsion pump;

a second cable assembly operably connected to said rod assembly by a lever assembly, and one end of said second cable assembly being connected to a steering valve, said rod assembly being mounted for slidable movement through one end of said lever assembly;

said rod assembly being movable longitudinally through said one end of said lever assembly and said universal means in response to selective pivotal movement of said handle assembly in a first direction to extend or retract said first cable means thereby actuating said propulsion pump for controlling forward and reverse movement and ground speed of said machine; and said rod assembly being pivoted about said universal means in response to selective pivotal movement of said handle assembly in a second direction, transverse to said first direction, to extend or retract said second cable means thereby actuating said steering valve.

2. The control system as defined in claim 1 wherein said first cable means includes a core rod and housing enclosing said core rod along a partof its length, said core rod being connected to a control lever from said propulsion pump, adjustable means connected to said housing for selectively moving said housing relative to said core rod to thereby actuate said propulsion pump independently of movement by said rod assembly.

3. The control system as defined in claim 2 wherein said mono stick assembly includes locking means for selectively holding said handle assembly in a fixed position while said adjustable means is being used to actuate said propulsion pump, said handle means being operable from said fixed position to override the actuation of said propulsion pump by said adjustable means.

4. A control system for a hydrostatically operated earth-working machine having plural hydraulic circuits, said control system controlling ground speed, forward and reverse movement, steering, and braking for said machine, said control system comprising:

a mono stick assembly including a manually operable handle assembly capable of pivotal movement in any direction, a control member connected to said handle assembly, said control member being mounted to a universal pivot means, said universal means permitting longitudinal sliding movement of said control member and pivotal movement of said control member in response to selective pivotal movement of said handle assembly;

a cable assembly mounted to said control member and said cable assembly connected to a hydraulic propulsion pump, said control member being movable in response to selective pivotal movement of said handle assembly to actuate said propulsion pump for controlling forward and reverse movement and ground speed of said machine; and said cable assembly including a core rod and housing enclosing said core rod along a part of its length, said core rod being connected to a control lever from said propulsion pump, adjustable means connected to said housing for selectively moving said housing relative to said core rod to thereby actuate said propulsion pump independently of movement by said control member.

5. The control system as defined in claim 4 wherein said mono stick assembly includes locking means for selectively holding said handle assembly in a fixed position while said adjustable means is being used to actuate said propulsion pump, said handle means being operable from said fixed position to override the actuation of said propulsion pump by said adjustable means.

6. A control sytem for a hydrostatically operated earth-working machine having plural hydraulic circuits, said control system controlling ground speed, forward and reverse movement, steering, and braking for said machine, said control system comprising:

a mono stick assembly including a manually operable handle assembly capable of pivotal movement in any direction, a control member connected to said assembly, said control member being mounted to a universal pivot means, said universal means permitting longitudinal sliding movement of said control member and pivotal movement of said control member in response to selective pivotal movement of said handle assembly;

a pair of actuating assemblies mounted to said control member, one of said actuating assemblies connected to a propulsion means and the other actuating assembly connected to a steering means;

said control member being movable longitudinally in response to selective pivotal movement of said handle assembly in a first direction to actuate said propulsion means for controlling forward and reverse movement and ground speed of said machine; and said control member being pivotal about said universal means in response to selective pivotal movement of said handle assembly in a second direction, transverse to said first direction, to actuate said steering means;

said one actuating assembly including a core rod and housing enclosing said core rod along a part of its length, said core rod being connected to a control lever from said propulsion means, adjustable means connected to said housing for selectively moving said housing relative to said core rod to thereby actuate said propulsion means independently of movement by said control member.

7. The control sytem as defined in claim 6 wherein said mono stick assembly includes locking means for selectively holding said handle assembly in a fixed position while said adjutable means is being used to actuate said propulsion means, said handle means being operable from said fixed position to override the actuation of said propulsion means by said adjustable means.

* * * * *